United States Patent
Boardman et al.

(10) Patent No.: US 8,145,988 B2
(45) Date of Patent: Mar. 27, 2012

(54) COMMAND LINE TESTING

(75) Inventors: Trevor John Boardman, Hampshire (GB); Lucy Amanda Raw, Hants (GB); Ronald J. Venturi, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/940,251

(22) Filed: Nov. 14, 2007

(65) Prior Publication Data
US 2008/0126918 A1 May 29, 2008

(30) Foreign Application Priority Data
Nov. 25, 2006 (GB) .................................... 0623541.0

(51) Int. Cl.
*G06F 7/02* (2006.01)
(52) U.S. Cl. .......................... 714/819; 714/742; 714/739
(58) Field of Classification Search .................. 714/819, 714/742, 724, 739, 703, 37
See application file for complete search history.

(56) References Cited

U.S. PATENT DOCUMENTS

| | | | |
|---|---|---|---|
| 6,393,413 B1 * | 5/2002 | Jorgensen et al. | 706/20 |
| 7,890,806 B2 * | 2/2011 | Kwong et al. | 717/124 |
| 2007/0011192 A1 * | 1/2007 | Barton | 707/103 R |

* cited by examiner

Primary Examiner — Fritz Alphonse
(74) Attorney, Agent, or Firm — David W. Victor; Konrad Raynes & Victor LLP (57) ABSTRACT

Provided are a system, method and article of manufacture for validating an expected data output of an application under test. A first table comprising named columns populated with the expected data output and a second table comprising named columns associated with the expected data output of the named columns of the first table are retrieved. The named columns of the first table are compared with the named columns of the second table. An alert is generated in response to detecting a difference between a characteristic of a named column of the first table and a characteristic of a named column of the second table.

21 Claims, 6 Drawing Sheets

COMMAND LINE TESTING

CROSS-REFERENCE TO RELATED APPLICATIONS

This applications claims priority benefits under Title 35, United States Code, Section 119(a)-(d) or Section 365(b) of United Kingdom Patent Application No. GB0623541.0, filed on Nov. 25, 2006, by Trevor John BOARDMAN, Lucy Amanda RAW, and Ronald J. VENTURI, and entitled "A COMMAND LINE TESTING APPARATUS", which application is incorporated herein by reference in its entirety.

FIELD OF THE INVENTION

The invention relates to the field of software testing and a command line interface testing apparatus for verifying expected outputs of a software application under test.

BACKGROUND

Software testing is an integral, costly and time-consuming activity in the software development life cycle. Each time an application is built it must be intensively tested. A typical software testing cycle comprises a development team writing code which implements features of a specification and building the features into an executable program. A test team examines the specification and determines which features of the specification have been implemented and writes tests to test those features. The test team runs the tests against the executable program and reports any errors. The reported errors are corrected and the test team runs more tests and reports any further errors found. Once no further errors have been found the development team may choose to implement further features from the specification or change the specification and implement those features or release the executable program to users. If more features are implemented or if features are changed the test software must be updated to account for this.

This cycle will typically be repeated thousands of times in the lifetime of a program.

Figure 1:
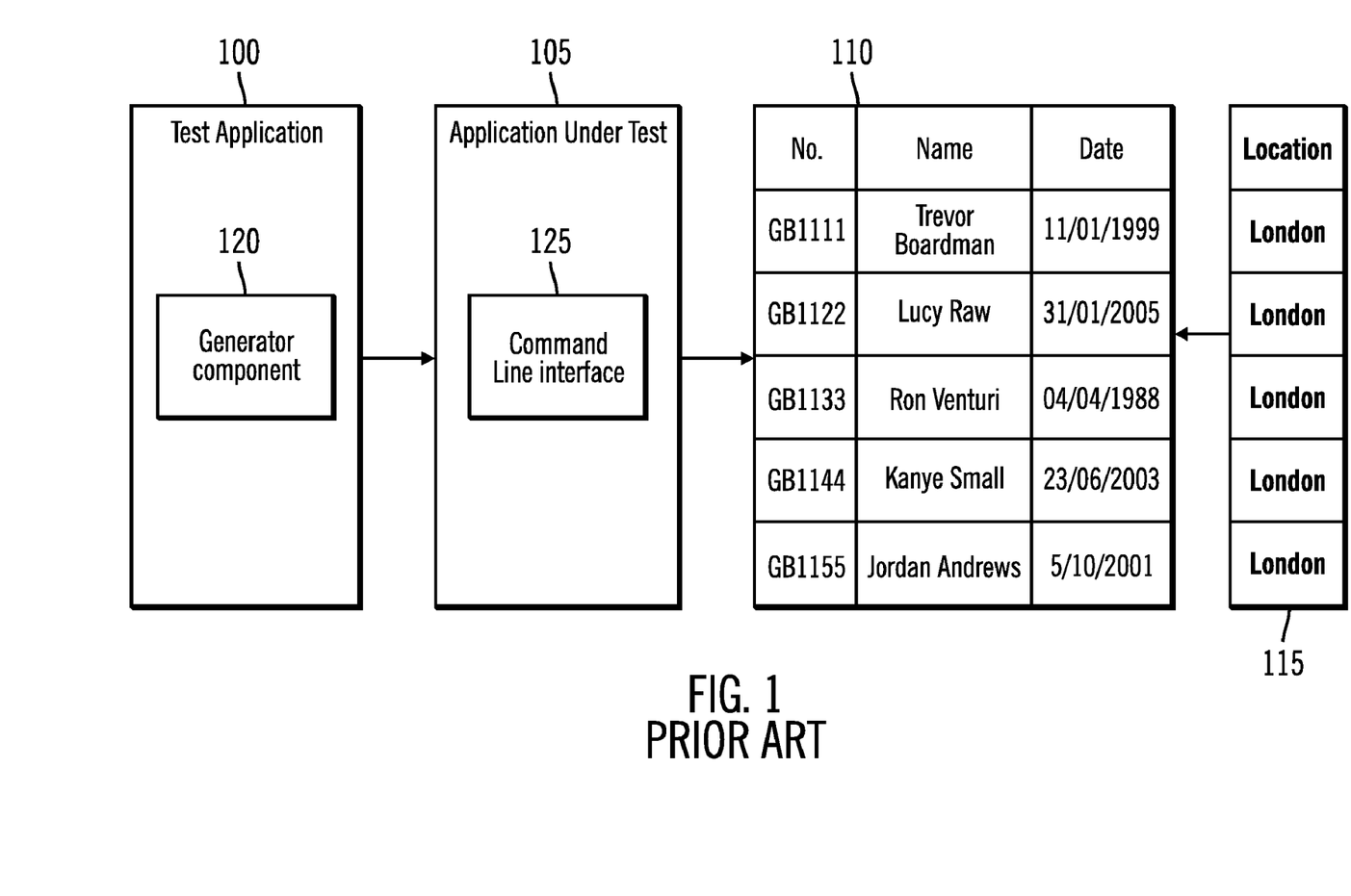
FIG. 1 is a block diagram illustrating a software test application as is known in the art.

FIG. 1 illustrates a typical test system wherein a test application 100 generates 120 commands for executing a function at a command line interface 125 of an application under test 105. Software which tests command line interfaces is normally required to ensure that all parts of the output 110 of each command are within an expected range of values as specified by the specification. During the development of a project the specification will often change. This requires that the test application 100 is changed at the same time, for example, testing new functionality which would produce new data output 115. This is very time consuming and error prone.

The application under test 105 in response to a command being executed at its command line interface 125 produces an output 110 in the form of tables (also known as actual data) with a name at the top of each column as shown in example 1 below.

Example

| Identity Name | IP_Address | Alias |
|---|---|---|
| 01234 | rc_cluster1 9.7.88.4 | Main_Cluster |
| 01235 | rc_cluster2 9.7.88.5 | Aux_Cluster |
| 01236 | rc_cluster3 9.7.88.6 | Spare_Cluster |

One solution is to use the names of the columns to determine the location of each column in a view and get the expected range for that column from a table.

However, this has the following drawbacks:
1. If in a new version of the system under test a new column were introduced it would not be tested and if an existing column went missing this would not be noticed by the test software.
2. It is time consuming to scan for each column each time a value in the view is tested.

Therefore there is a need in the art for a method and apparatus which overcomes the above disadvantages and to reduce the time required to incorporate any changes into the test specification while reducing the possibility of errors.

SUMMARY

Provided are a system, method and article of manufacture for validating an expected data output of an application under test. A first table comprising named columns populated with the expected data output and a second table comprising named columns associated with the expected data output of the named columns of the first table are retrieved. The named columns of the first table are compared with the named columns of the second table. An alert is generated in response to detecting a difference between a characteristic of a named column of the first table and a characteristic of a named column of the second table.

BRIEF DESCRIPTION OF THE DRAWINGS

Embodiments are described below in detail, by way of example only, with reference to the accompanying drawings in which.

DETAILED DESCRIPTION

Described embodiments provide a command line interface testing apparatus for validating an expected data output of an application under test, in a data processing test system, the apparatus comprising: a retrieval component for retrieving a first table comprising named columns populated with the expected data output and a second table comprising named columns associated with the expected data output of the named columns of the first table; a comparator component for comparing the named columns of the first table with the named columns of the second table; and a notification component for generating an alert, in dependence on detecting a difference between a characteristic of a named column of the first table and a characteristic of a named column of the second table.

Described embodiments further provide for a picture to built up of the test data that is to be used to test an output of data from an application under test. The command line testing apparatus provides a view descriptor file which specifies for each command, which is to be tested on the application under test, the named columns of the expected output of the test data for each of the specified named columns. The view descriptor file also specifies the correct order in which the named columns should appear in the expected data. The command line interface testing apparatus is the able to compare the view descriptor file against the expected data generated by a test team. If missing columns are found in the expected data an alert is generated and the test team is giving the opportunity to rectify the error. If it is found that there are named columns in the expected data which are not in the view descriptor file, an alert is generated and the test team is given an opportunity in which to rectify the error.

Further embodiments provide that ranges of values of expected data for each named column can also be specified in the view descriptor file. Such that the expected data can be verified for the correct range of value before the expected data is compared to the actual data generated by the application under test.

Therefore the procedure of testing the outputs of an application under test can be greatly enhanced by using the command line testing apparatus. The expected data (the test data) will be checked and verified by the command line interface testing apparatus and as such fewer errors will be generated when testing the expected data with the actual data generated from the application under test.

A further embodiment provides a command line interface testing method for validating an expected data output of an application under test, in a data processing test system, the method comprising the steps of: retrieving a first table comprising named columns populated with the expected data output and a second table comprising named columns associated with the expected data output of the named columns of the first table; comparing the named columns of the first table with the named columns of the second table; and generating an alert, in dependence on detecting a difference between a characteristic of a named column of the first table and a characteristic of a named column of the second table.

A yet further embodiment provides a computer program loadable into the internal memory of a digital computer, comprising software code portions for performing, when said product is run on a computer, to carry out the steps of the method as described above.

Figure 2:
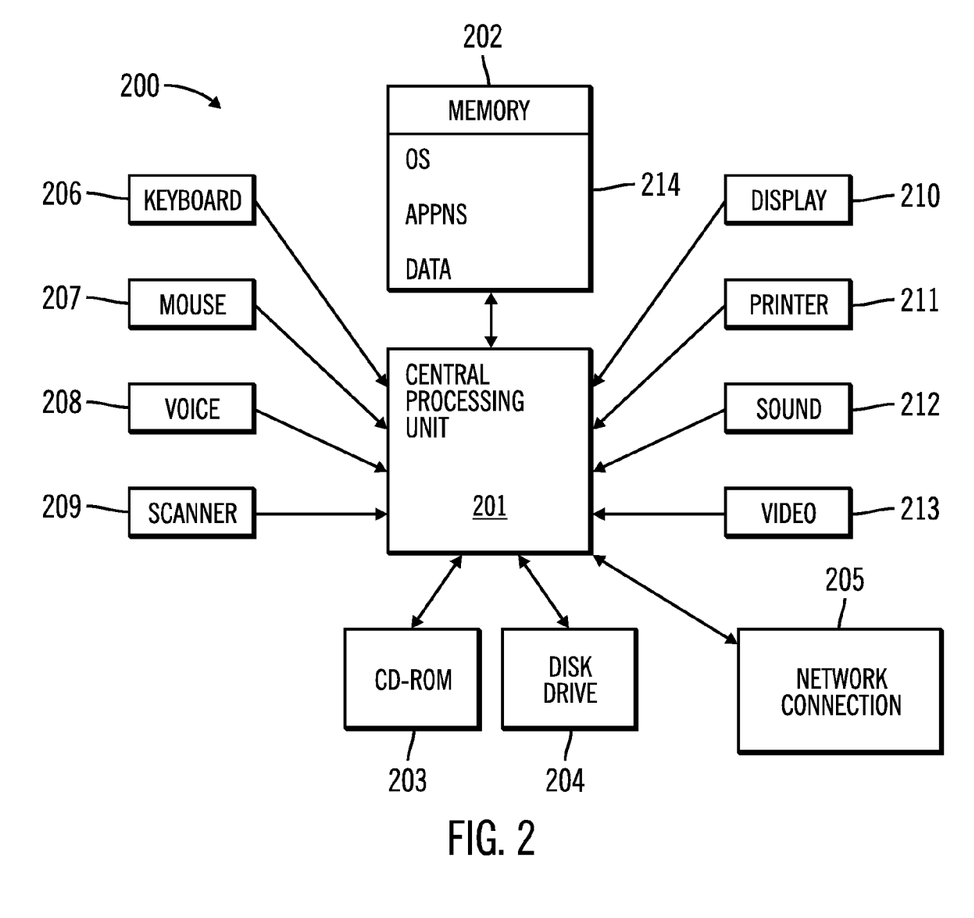
FIG. 2 is an embodiment of a data processing apparatus.

Referring to FIG. 2, a computer system 200 is shown in which described embodiments may be implemented. A computer system 200 has a central processing unit 201 with primary storage in the form of memory 202 (RAM and ROM). The memory 202 stores program information and data acted on or created by the programs. The program information includes the operating system code for the computer system 200 and application code for applications running on the computer system 200. Secondary storage includes optical disk storage 203 and magnetic disk storage 204. Data and program information can also be stored and accessed from the secondary storage.

The computer system 200 includes a network connection means 205 for interfacing the computer system 200 to a network such as a local area network (LAN) or the Internet. The computer system 200 may also have other external source communication means such as a fax modem or telephone connection.

The central processing unit 201 comprises inputs in the form of, as examples, a keyboard 206, a mouse 207, voice input 208, and a scanner 209 for inputting text, images, graphics or the like. Outputs from the central processing unit 200 may include a display means 210, a printer 211, sound output 212, video output 213, etc.

In a distributed system, a computer system 200 as shown in FIG. 2 may be connected via a network connection 205 to a server (not shown) on which applications may be run remotely from the central processing unit 101 which is then referred to as a client system.

Applications may run on the computer system 200 from a storage means 203, 204 or via a network connection 205 which may include spread sheet applications, database applications and other storage and retrieval mechanisms.

Figure 3:
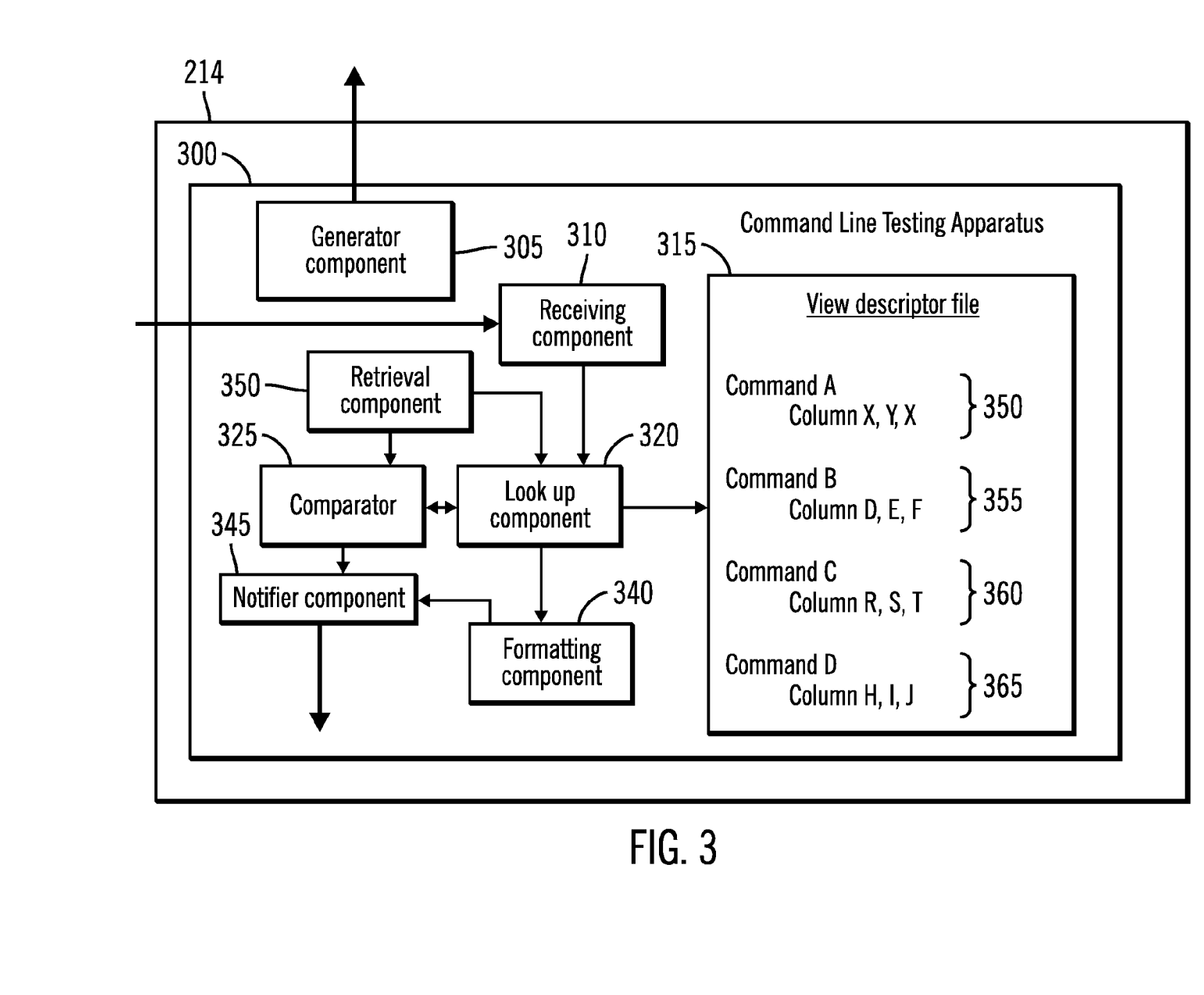
FIG. 3 is an embodiment of a block diagram illustrating a verification component.

FIG. 3 illustrates the command line testing apparatus 300. The command line testing apparatus 300 interfaces with existing software testing applications 100 in order to extend and enhance their current functionality. The command line testing apparatus 300 comprises a number of components which interact and interface with each other in order to format and validate the output of the application under test 105 when compared with the expected output data 110 from the command line testing apparatus 300.

The command line testing apparatus 300 comprises a generator component 305 for generating command line instructions to be executed by a command line interface of an application under test 105, a receiving component 310 for receiving the generated output (actual data) from the application under test 105, a lookup component 320 for determining the expected format of the expected data from a view descriptor file 315, a formatting component 340 for formatting the expected data into the format specified in the view descriptor file 315, a comparator component 325 for comparing the formatted expected data with the actual data to determine if any discrepancies exists, a retrieval component for retrieving the expected data and the view descriptor file 350 from storage and a notifier component 325 for generating an error flag if an error is found. Each of the components will now be explained in turn.

The generator component 305 generates a number of command line instructions. These command line instructions execute an action to be performed by the application under test 105. For example, the application under test 105 may be a database application and therefore a command could be to run a query to retrieve a list of employees—listed by employee number, or employee names and addresses, date of service, salary information, etc. For each command to be executed there is an expected data output, for example, if the command is to list all employees by employee number, then the expected data output may be for example, GB01234, GB05678, etc. The generator 305 component also comprises an API (not shown) for interfacing with the application under test in order to execute the commands.

Once each of the commands has been run at the application under test 105, the application under test 105 will produce a set of actual data i.e. the data that is produced by the application under test in response to a command being issued by the verification component 300. A receiving component 310 receives the actual data in the form of a test file. The receiving component 310 verifies which application under test the test file has been sent from and communicates the test file to the lookup component 320 for further processing. The test file is a file comprising a view of a number of named columns, each column comprising actual data generated by the application under test.

The lookup component 320 analyses the test file to understand the format of the view; for example, that the first column in the view comprises employee number data and the second column comprises employee name data, etc. The lookup component 320 interfaces with a view descriptor file 315 which comprise data concerning the correct formatting of the expected data. The view descriptor file 315 comprises a list of each command to be executed by the application under test and for each command the required named columns of data to be displayed. For example for a command 'A' 350, the expected columns are column 'X' for displaying data about 'X', column 'Y' for displaying data about 'Y' and column 'Z' for displaying data about 'Z' and so on.

For a command 'B' 355, the expected named columns are column 'D' for displaying data about 'D', column 'E' for displaying data about 'E' and column 'F' for displaying data about 'F'.

For example for a command 'C' 360, the expected named columns are column 'R' for displaying data about 'R', column 'S' for displaying data about 'S' and column 'T' for displaying data about 'T' and so on.

For a command 'D' 365, the expected named columns are column 'H' for displaying data about 'H', column 'I' for displaying data about 'I' and column 'J' for displaying data about 'J'.

The view descriptor file 315 can be updated with additional columns or existing columns can be removed at any time prior to the testing of the application under test. If the application under test 105 is given a new piece of functionality then the required column view can be updated in the view descriptor file.

The lookup component 320 performs a lookup in the view descriptor file 315 to determine the correct formatting of the named columns of the expected data. The formatting component 340 begins by formatting the named columns of the expected data into the order specified in the view descriptor file 315. Once this is complete the comparator component 325 determines if there are any named columns found in the expected data which are not present in the view descriptor file 315. If any named columns are found that are not present in the view descriptor file 315 an alert is raised informing the tester that unknown data has been detected. Further, if any named columns are found in the view descriptor file 315 but not in the expected data, the notification component raises as alerts notifying the tester of missing data.

Figure 4:
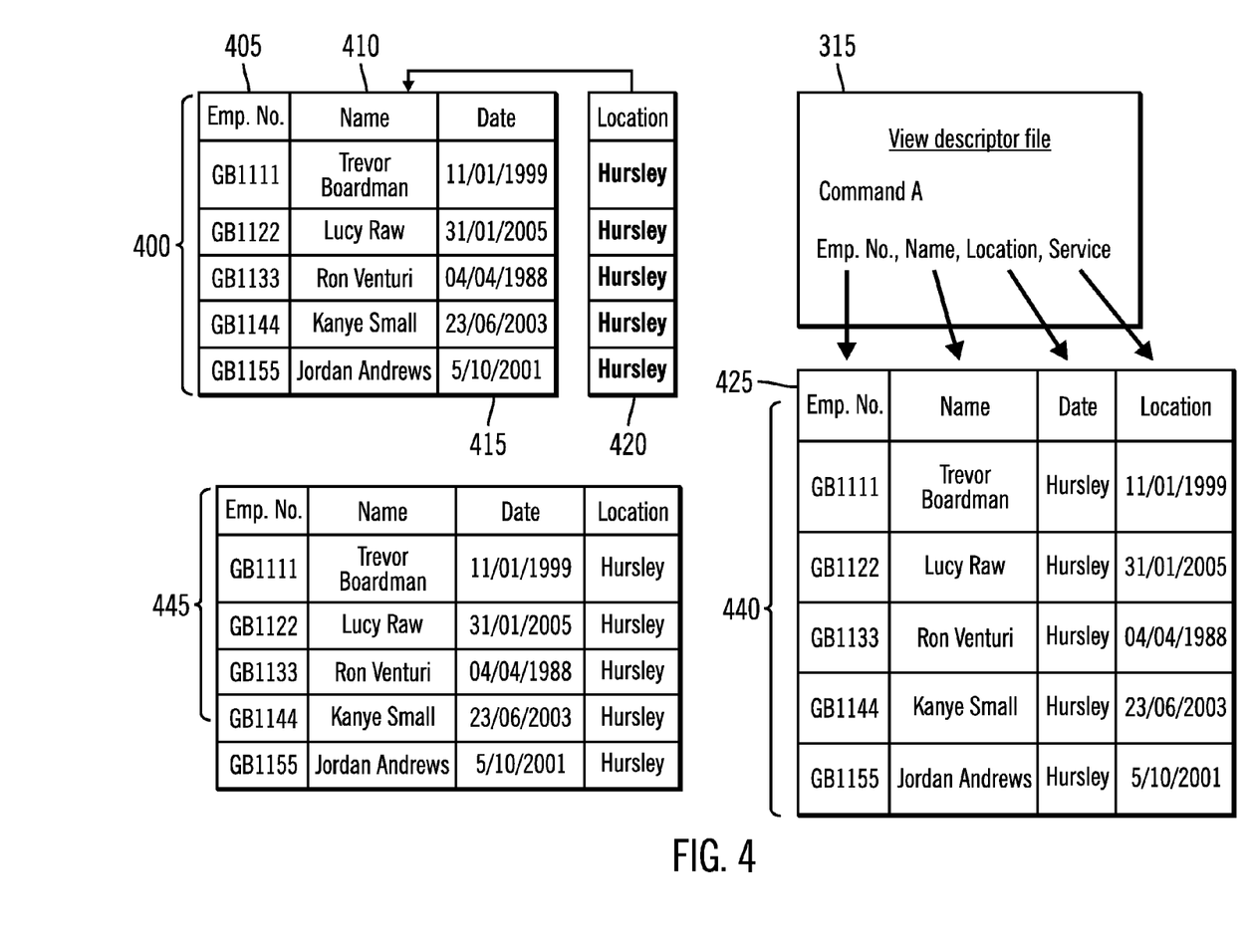
FIG. 4 is an embodiment of a view descriptor file of the verification component.

FIG. 4 shows a table of expected data 400, a table of formatted expected data 440, a table of actual data 445 and a view descriptor file 315. The expected data 400 comprises a table having three columns, namely employee number 405, employee name 410 and the start date of the employee's service 415. Each column comprises five rows of expected data populated with the data that is expected to arise from the application under test 105.

The view descriptor file 315 represents the expected named columns for command A, i.e. employee number, employee name, location and date of service. This, the view descriptor file 315 specifies the format of the named columns of the expected data. Comparing the named columns of the expected data 400 with the named columns of the view descriptor file 315 it can be seen that the formatting of the named columns of the expected data 400 does not match the formatting specified in the view descriptor file 315 because the location column 420 is not present. Hence in this instance the notification component 345 generates an alert message alerting the tester to the missing location data 420. The tester is then able to update the expected data with the missing information.

If for example, a new piece of functionality has been added to the application under test 105—i.e. click this query button to retrieve a list of each employee's base location—and the expected data does not comprise this additional column 420—a discrepancy will arise between the expected data and the view descriptor file 315 and the notification component 345 will generate an alert message notifying the tester of missing data. The tester is then given the option to rectify the error.

If in another example, a new piece of functionality has been added to the application under test 105—i.e. click this query button to retrieve a list of each employee's base location and the named columns of the expected data 400 comprises this information but the view descriptor file 315 does not then an alert message is generated alerting the tester of the detection of unknown data. The tester is then given the option to rectify the error.

In another type of situation, the lookup component 320 detects when a column exists both in the expected data 400 and the view descriptor file 315 but in the wrong the order. For example, when the location column 420 is appended to the date column 415 in the expected data 400 but its correct position is in between the name 410 and the date column 415. In this instance, the formatting component 340 formats the expected data 400 such that each of the columns is located in the correct order as specified in the view descriptor file 315.

On completion of the formatting operation by the formatting component 340, a comparator component 325 compares the formatted expected data 440 with the actual data 450. If at any time in the comparison step the comparator component 325 finds actual data 450 that does not match the formatted expected data 440 the comparator component 325 notifies a notification component 345 and the notification component 345 generates an error message.

Figure 5:
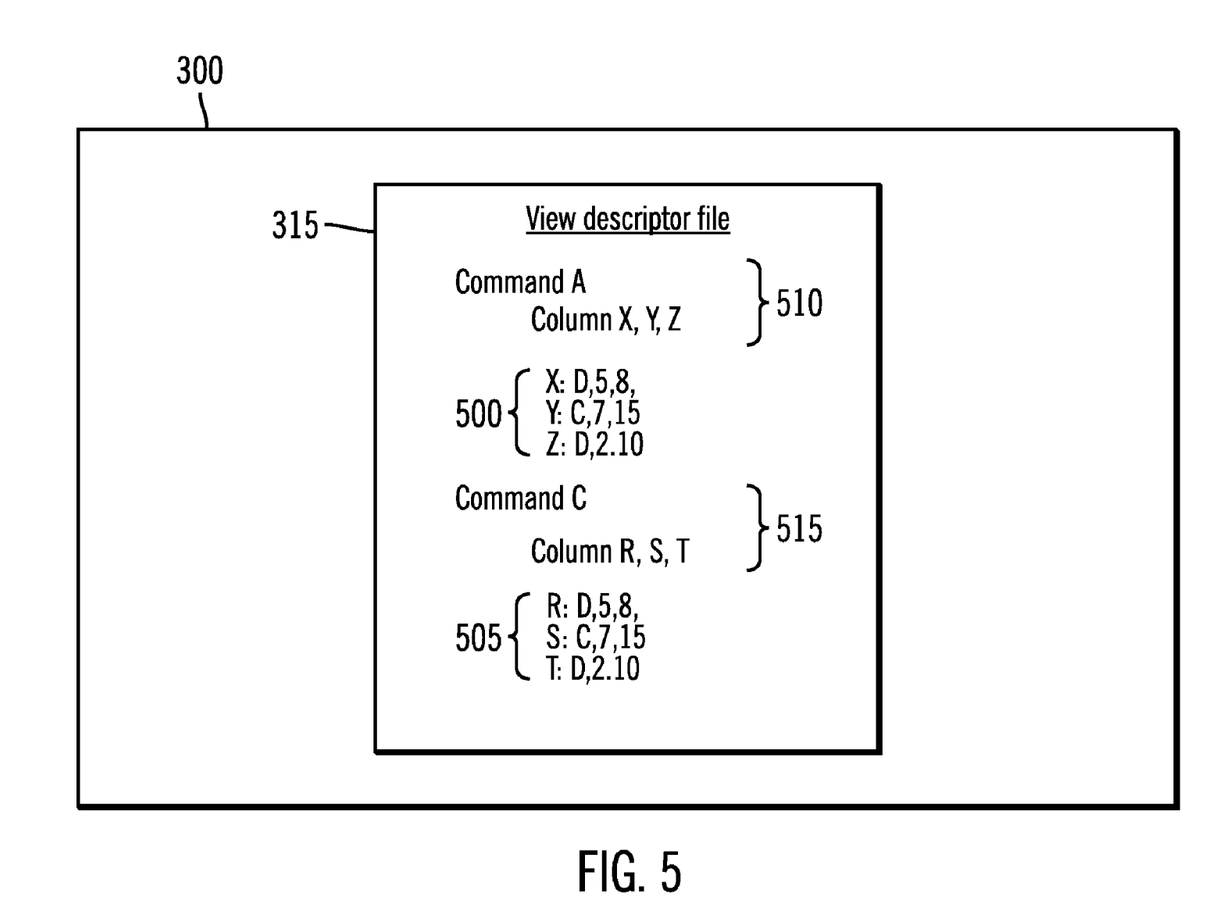
FIG. 5 is a further example of a view descriptor file of the verification component.

In another embodiment the view descriptor file 315 may comprise a range 500, 505 of expected outputs for each column of data. This is shown with reference to FIG. 5. In this example, for each of the listed commands and then for each of the listed columns a range 500, 505 is given for the expected data output. For example, command 'A' 510 comprises columns X, Y and Z. However, for the data contained in column X the data is to be in the range of five to eight digits, the data in column y is to be in the range of seven to fifteen digits and the data in column Z is to be within the range of two to ten digits. In this instance the view descriptor file also list the ranges of expected values for columns R, S and T when executed by command C 515. Thus the view descriptor file 315 can use dynamic data opposed to hard coded data. The view descriptor file 315 can also list a number of verification rules which are used to verify the actual data against a pre-defined set of validation rules. For example, employees who joined the company on the first September will have a base location of London, England etc.

Figure 6:
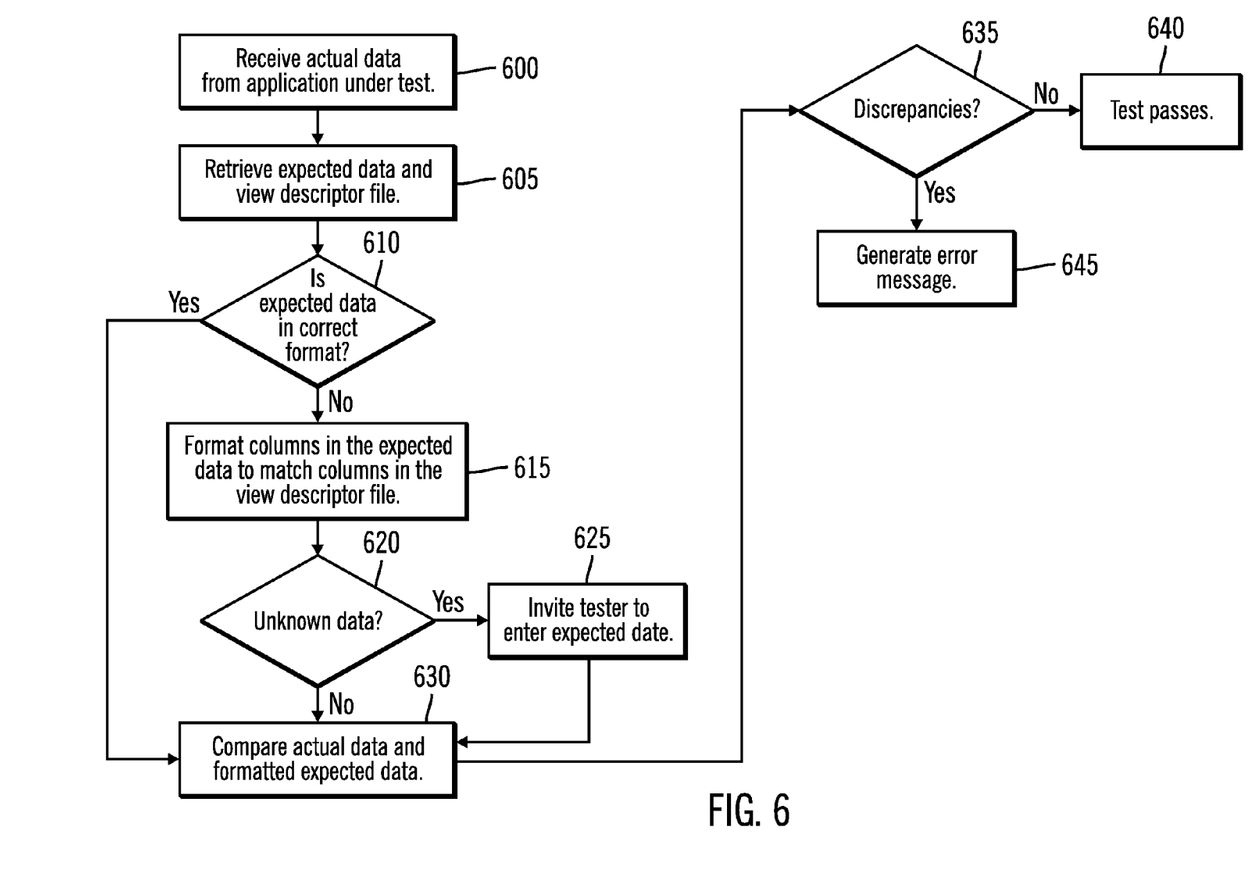
FIG. 6 is an embodiment of a flow chart illustrating the process steps.

FIG. 6 illustrates an embodiment of process steps. At step 600 the receiving component 310 receives the actual data 445 from the application under test 105. At step 605 the retrieval component 605 retrieves the expected data 400 and the view descriptor file 315 from a data store. The lookup component 320 performs a lookup in the view descriptor file 315 to determine if the named columns of the expected data 400 are in the format as described in the view descriptor file 315. If the determination is positive control moves to step 630 and the comparator component 325 compares the expected data 400 to the actual data 445 to test for any discrepancies in the actual data 445 at step 635. If there are discrepancies control passes to step 645 and an alert is generated. If there are no detected discrepancies control moves to step 640 and the test passes.

Moving back to step 610, if the comparator component 325 determines that named columns of the expected data 400 are not in the format specified in the view descriptor file 315 the format component 340 formats the named columns into the order specified in the view descriptor file 315 to produce formatted expected data 440. On completion of this step control moves to step 620 and the comparator component 325 determines whether there are either unknown named columns of missing named columns in either the expected data 400 or the view descriptor file 315. If the determination is positive and is either unknown data or missing data control moves to step 625 and an alert message is generated alerting the tester to rectify the situation.

If however, the determination of step 620 is positive the formatted expected data 440 is compared to the actual data at step 630. If there are discrepancies control passes to step 645 and an alert is generated. If there are no detected discrepancies control moves to step 640 and the test passes.

What is claimed is:

1. A system for validating an expected data output of an application under test, comprising:
    a retrieval component for retrieving a first table comprising named columns populated with the expected data output and a second table comprising named columns associated with the expected data output of the named columns of the first table;
    a comparator component for comparing the named columns of the first table with the named columns of the second table; and
    a notification component for generating an alert in response to detecting a difference between a characteristic of a named column of the first table and a characteristic of a named column of the second table.

2. The system of claim 1, wherein the detected difference causing the generating of the alert comprises a presence of a named column in one of the first and second tables that is not in both the first and second tables.

3. The system of claim 1, wherein the detected difference causing the generating of the alert comprises an order of the named columns in the first table not being the same as the order of the named columns of the second table, further comprising:
    a formatting component for formatting the named columns of the first table into the same order as the named columns of the second table in response to the detected difference between characteristics being that the order of the named columns in the first table is not the same order as the order of named columns in the second table.

4. The system of claim 1, wherein the characteristic of a named column of the first table and the second table comprises a range of values of expected outputs, and wherein the detected difference causing the generating of the alert comprises a difference in the range of values detected in a named column of the first table when compared to the named columns of the second table.

5. The system of claim 1, wherein the generated alert requests the input of corrected named columns of expected data.

6. The system of claim 1, further comprising:
    a receiving component for receiving corrected named columns of the expected data output and incorporating the received data into the expected data output.

7. The system of claim 1, wherein the comparator component further performs:
    comparing the expected data output to the actual data to test for further discrepancies in response to the comparator component not detecting any difference between the characteristic of a named column of the first table and the characteristic of a named column of the second table.

8. A method for validating an expected data output of an application under test, comprising:
    retrieving, from a memory, a first table comprising named columns populated with the expected data output and a second table comprising named columns associated with the expected data output of the named columns of the first table;
    comparing the named columns of the first table with the named columns of the second table; and
    generating an alert in response to detecting a difference between a characteristic of a named column of the first table and a characteristic of a named column of the second table.

9. The method of claim 8, wherein the detected difference causing the generating of the alert comprises a presence of a named column in one of the first and second tables that is not in both the first and second tables.

10. The method system of claim 8, wherein the detected difference causing the generating of the alert comprises an order of the named columns in the first table not being the same as the order of the named columns of the second table, further comprising:
    formatting the named columns of the first table into the same order as the named columns of the second table in response to the detected difference between characteristics being that the order of the named columns in the first table is not the same order as the order of named columns in the second table.

11. The method of claim 8, wherein the characteristic of a named column of the first table and the second table comprises a range of values of expected outputs, and wherein the detected difference causing the generating of the alert comprises a difference in the range of values detected in a named column of the first table when compared to the named columns of the second table.

12. The method of claim 8, wherein the generated alert requests the input of corrected named columns of expected data.

13. The method of claim 8, further comprising:
    receiving corrected named columns of the expected data output and incorporating the received data into the expected data output.

14. The method of claim 8, further comprising:
    comparing the expected data output to the actual data to test for further discrepancies in response to not detecting any difference between the characteristic of a named column of the first table and the characteristic of a named column of the second table.

15. An article of manufacture comprising a computer readable medium having code executed to validate an expected data output of an application under test and perform operations, the operations comprising:
    retrieving a first table comprising named columns populated with the expected data output and a second table comprising named columns associated with the expected data output of the named columns of the first table;
    comparing the named columns of the first table with the named columns of the second table; and
    generating an alert in response to detecting a difference between a characteristic of a named column of the first table and a characteristic of a named column of the second table.

16. The article of manufacture of claim 15, wherein the detected difference causing the generating of the alert comprises a presence of a named column in one of the first and second tables that is not in both the first and second tables.

17. The article of manufacture system of claim 15, wherein the detected difference causing the generating of the alert comprises an order of the named columns in the first table not being the same as the order of the named columns of the second table, wherein the operations further comprise:

formatting the named columns of the first table into the same order as the named columns of the second table in response to the detected difference between characteristics being that the order of the named columns in the first table is not the same order as the order of named columns in the second table.

18. The article of manufacture of claim 15, wherein the characteristic of a named column of the first table and the second table comprises a range of values of expected outputs, and wherein the detected difference causing the generating of the alert comprises a difference in the range of values detected in a named column of the first table when compared to the named columns of the second table.

19. The article of manufacture of claim 15, wherein the generated alert requests the input of corrected named columns of expected data.

20. The article of manufacture of claim 15, wherein the operations further comprise:

receiving corrected named columns of the expected data output and incorporating the received data into the expected data output.

21. The article of manufacture of claim 15, wherein the operations further comprise:

comparing the expected data output to the actual data to test for further discrepancies in response to not detecting any difference between the characteristic of a named column of the first table and the characteristic of a named column of the second table.

* * * * *